US011403890B2

(12) United States Patent
Hukill et al.

(10) Patent No.: US 11,403,890 B2
(45) Date of Patent: Aug. 2, 2022

(54) FILTER ELEMENT ANALYSIS SYSTEM AND ASSOCIATED METHODS

(71) Applicant: MANN+HUMMEL GmbH, Ludwigsburg (DE)

(72) Inventors: Brandon Hukill, Holly Springs, NC (US); Jon Nichols, Four Oaks, NC (US); Charles Vaillant, Holly Springs, NC (US); Yew Chong, Singapore (SG); Arpan Penkar, Singapore (SG); Matthew Nunn, Singapore (SG); Andreas Scope, Oberschoena (DE); Kevin Babb, Vicksburg, MI (US); Karlheinz Munkel, Oberderdingen-Flehingen (DE); Markus Beylich, Ludwigsburg (DE); Nicolas Payen, Singapore (SG); Stefan Kunze, Tuebingen (DE); Uwe Plach, Weil der Stadt (DE); Lars-Thorsten Porschke, Bad Liebenzell (DE); Stephan Braun, Markgroeningen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/818,665

(22) Filed: Mar. 13, 2020

(65) Prior Publication Data
US 2020/0380797 A1 Dec. 3, 2020

Related U.S. Application Data

(63) Continuation of application No. 15/705,367, filed on Sep. 15, 2017, now abandoned.

(30) Foreign Application Priority Data

Nov. 23, 2016 (EP) ..................................... 16290221

(51) Int. Cl.
G07C 5/00 (2006.01)
G01S 19/24 (2010.01)
(Continued)

(52) U.S. Cl.
CPC .............. *G07C 5/008* (2013.01); *G01S 19/24* (2013.01); *G07C 5/0808* (2013.01);
(Continued)

(58) Field of Classification Search
CPC ..... G01S 19/24; G07C 2205/02; G07C 5/006; G07C 5/008; G07C 5/0808; G07C 5/08;
(Continued)

(56) References Cited

U.S. PATENT DOCUMENTS 5,774,056 A 6/1998 Berry, III et al.
9,322,678 B1 4/2016 Stawitzky et al.
(Continued)

*Primary Examiner* — Aaron L Troost

(57) ABSTRACT

A filter element analysis system for analyzing a filter element within a vehicle, the system including various filter sensors so as to provide information regarding various filter element parameters, a locator which configured provide vehicle position information such that conditions regarding the vehicle environment can be tracked and correlated to the location, as well as a means for transmitting information to a remote server for analysis and tracking of the filter element information with regard to environmental conditions such that a filter element status, remaining filter life, or particle load and replacement timeline can be calculated and updated so as to provide more accurate predictive models of the filter element conditions. As well as provide alerts regarding the need and scheduling of replacement or cleaning of a particular filter element.

5 Claims, 9 Drawing Sheets

(51) Int. Cl.
*G07C 5/08* (2006.01)
*H04L 67/12* (2022.01)
*H04W 84/18* (2009.01)

(52) U.S. Cl.
CPC .......... *G07C 2205/02* (2013.01); *H04L 67/12* (2013.01); *H04W 84/18* (2013.01)

(58) Field of Classification Search
CPC ..... G07C 5/0841; G07C 5/0816; H04L 67/12; H04W 84/18
See application file for complete search history.

(56) References Cited

U.S. PATENT DOCUMENTS

| | | | | |
|---|---|---|---|---|
| 2007/0078528 | A1* | 4/2007 | Anke .................... | G07C 5/008 700/21 |
| 2010/0087983 | A1* | 4/2010 | Boss ..................... | G06Q 10/20 701/31.4 |
| 2010/0315204 | A1* | 12/2010 | Kamel .................... | B61K 9/04 340/10.51 |
| 2013/0317694 | A1* | 11/2013 | Merg .................... | G07C 5/008 701/31.6 |
| 2017/0372534 | A1* | 12/2017 | Steketee ................. | E02F 3/96 |
| 2018/0051442 | A1* | 2/2018 | Igarashi ................ | E02F 9/2054 |

* cited by examiner

FILTER ELEMENT ANALYSIS SYSTEM AND ASSOCIATED METHODS

TECHNICAL FIELD

The present disclosure generally relates to the field of monitoring systems, and more particularly to a filtration monitoring system in large equipment and vehicles.

BACKGROUND

When using large motorized machinery, and particularly in the field of vehicles in extreme conditions it is of particular advantage to ensure that air being utilized in their respective engines be clean so as to avoid damaging the machine. It is well understood that these machines operate in an optimal fashion when the filter elements are regularly replaced or cleaned, and changing or cleaning the filter element prematurely, while ensuring smooth operation can result in unnecessary downtime, excess cost due to replacement cost, or damage to the filter element during unnecessary cleaning operations. Further, in particular environments, it can often require almost-constant supervision in order to determine precisely when a particular filter element needs replacement or cleaning. Changing a filter element too often can result in extra downtime, damage to filter elements, and overall costs. Likewise, not changing at appropriate intervals can lead to damage.

While conventional filter elements typically have guidelines for when a filter element should be replaced, such as a particular timeline, these guidelines may or may not reflect actual filter element state or particle load depending on a wide variety of potential operating conditions. One of the intended benefits of the present application seeks to optimize filter element cleaning and replacement, while reducing unnecessary downtime.

SUMMARY OF THE INVENTION

Contemplated herein is a filter element analysis system configured to aide in the proper timing and scheduling of filter element cleaning and maintenance, particularly within equipment systems operating in widely ranging conditions, for example farming or harvesting equipment wherein the conditions are largely dependent on locational and environmental conditions. It will be appreciated that particulate counts in the air can vary greatly depending on crop type, soil type, various weather conditions, or any number of additional factors, as will be appreciated by those having skill in the art. It will also be appreciated that these types of systems often include large and robust air filtration systems with one or more filter elements which can be expensive to both clean and/or replace. Additionally, cleaning operations can often lead to unintentional damage and thus require premature replacement of these large filter elements which is a source of undue cost. Additionally, changing the filter elements too often can result in large amounts of wasted man hours and crop waste due to unnecessary equipment downtime.

The filter element analysis system of the present invention will be discussed primarily with regard to air filter elements for purposes of illustration; however, it will be appreciated that other filter elements, such as oil or other fluid filter elements, can similarly benefit from various aspects of the present invention. As such, aspects of the present invention can be similarly applied to other filtration systems in various environments, including HVAC and other filtration systems.

Accordingly, the filter element analysis system as contemplated herein can thus include a filter element, the filter element being provided within a filter housing being provided in a system such as a vehicle or other equipment. The filter housing can include an inlet and an outlet, the inlet receiving a contaminated stream medium, i.e. dirty air, and the outlet providing a filtered stream medium, i.e. clean air. One or more filter sensors can then be provided within or about the filter housing, each sensor being configured to generate a signal correlating to various filter element parameters. The system can then further include a location determination mechanism, such as a GPS, positioning based on multiple Cellular Tower information or user input interface for inputting location information. The location determination mechanism can then be configured so as to provide location information regarding the vehicle.

The system can also include one or more control units, at least one primary control unit having a processing, multiple analog and digital sensors and a wireless communication mechanism such as wireless communication radio/modem. In such an embodiment, the processing unit can be configured to receive the filter element parameters from the one or more filter sensors and transmit the filter element parameters using the wireless communication mechanism to a remote server. The remote server can include a remote processing unit, and a non-transitory computer-readable medium. The remote server can then receive one or more environmental parameters correlating to an environment surrounding the vehicle. The remote server can also receive the filter element parameters from the control unit over the wireless network and, using both the filter element parameters and environmental parameters, determine a state or particle load of the filter element. Once the state or particle load of the filter element is determined, it can be transmitted back to the one or more control units.

In some embodiments a secondary control unit, such as an interface located within the cockpit or about filter housing can be provided which can include a display configured to display information regarding the state or particle load of the filter element. In some such embodiments, the primary control unit can be operatively connected to the secondary control unit utilizing wireless communication, and the secondary control unit is configured to transmit the filter element parameters to the remote server.

In some alternative embodiments, the primary control unit can be operatively connected to the remote server utilizing wireless communication, and the secondary control unit can be operatively connected to the remote server utilizing wireless communication, wherein the secondary control unit is configured to receive and display the information regarding the state or particle load of the filter element. In some embodiments, the secondary control unit can be provided as a mobile smart device provided with a mobile application loaded thereon, wherein the mobile smart device can receive user input and communicate wirelessly with the primary control unit either directly, through a wireless communication network, or over an internet connection. The application on the smart device can receive notifications from the server based on the plurality of sensor collected and non-collected data to determine various recommendations or warnings, such as critical filter status, dust load levels, remaining filter lifetime, and predictive maintenance times.

In some alternative embodiments, the remote server can utilize the global position of the filter element to access desired environmental parameters from an online database. Such as weather information regarding locations about the location of the equipment, such as recent rainfall, humidity, jet stream parameters and location, wind speed, wind gusts, current weather conditions, etc. In some similar embodiments, various environmental conditions can be obtained by providing one or more environmental sensors about the vehicle or equipment. The one or more environmental sensors can then be configured to provide a signal correlating to at least one environmental parameter about the environment in the direct vicinity of the equipment to the remote server through the one or more control units, etc.

It will also be appreciated that the various sensors, either environmental, or filter sensors can be configured to transmit their respective signals to the one or more control units utilizing wireless communication.

In yet additional embodiments the one or more control units can include a user input interface, wherein the user input interface can be configured to receive one or more environmental parameters or filter element parameters from a user or operator. Some exemplary parameters which can have an effect on filter element characteristics can include a vehicle activity, crop type, soil type, soil water content, soil PH-levels, visual filter element state or particle load, sound, vehicle responsiveness, or any number of other parameters as will be appreciated by those having skill in the art.

In yet additional embodiments the primary control unit can also include a local non-transitory computer-readable medium configured to store historical data regarding service life information being calculated based on one or more alternative filter elements with similar associated filter element parameters or working conditions correlated to each of the alternative filter elements.

In the various embodiments, sensors can include pressure sensors, accelerometers, flow sensors, strain sensors, humidity sensors, air-mass flow, temperature, particle counter, turbulence sensor, spectrometry, sound, vehicle operation parameters, and optical sensors.

Also, contemplated herein and illustrated in FIG. 7 is a method for analyzing a filter element within a vehicle, the method including various steps such as: providing a vehicle having one or more filter elements; providing one or more filter element sensors about filter element; providing a location determination mechanism; receiving a signal from each of the one or more filter sensors, the signal correlating to one or more filter element parameters; receiving location information regarding a specific vehicle location; receiving information regarding one or more environmental parameters correlating to an environment about the specific vehicle location; and determining a state or particle load of the filter element based on the one or more filter element parameters and the one or more environmental parameters. In some such embodiments, the filter element parameters can be transmitted to a remote server over a wireless network, wherein the determination of the state or particle load of the filter element is calculated remotely by the remote server. In some such alternative embodiments, the filter element parameters can be utilized in order to determine the state or particle load of the filter element locally by the one or more control units at a local level, wherein the parameters resulting in the determination are later transmitted to a remote server for storage and analyzation of an updated algorithm with periodic updates to the local algorithm used by the various local control units.

The method can alternatively include the steps of: providing a user input interface; and receiving one or more of the environmental parameters from a user through the user input interface.

Further, the method can include the steps of providing one or more environmental sensors about the vehicle; and receiving a signal correlating to one or more environmental parameters from the one or more environmental sensors about the vehicle.

In yet additional embodiments the method of analyzing a filter element within a vehicle of can include the steps of providing a display; and transmitting the determined state or particle load of the filter element to the display from the remote server over a wireless network.

In some additional embodiments contemplated herein, an alternative filter element analysis system for a vehicle can be provided which can include a filter element; a filter housing; a scanable tag affixed to either the filter element or filter housing; a scanning and input device, configured to obtain data from scanning the scanable tag; a remote server, configured to receive scanned and input information from the scanning and input device via a wireless network, wherein the remote server further comprises a remote processor and non-transitory computer-readable medium, the remote processor being configured to determine a filter element analysis based on the data retrieved from the scanned tag and an environmental parameter database that is in communication with the remote server.

In some such embodiments, the alternative filter element analysis can be based on user input information into the scanning and input device. Such input can include, environmental attribute information such as humidity, temperature, wind speed, crop type, soil type, location, altitude, and soil moisture level. The user can also input information regarding visual or user experience information such as filter element state or particle load, appearance, sounds, vehicle responsiveness, or other parameters best recognized by a user and are difficult to ascertain using sensors.

In some such embodiments, the scanable tag can include: a barcode, a QR code, a passive RFID tag, an active RFID tag, or a NFC tag.

In various related embodiments, the scanning and input device can automatically receive location information, wherein the remote server receives the location information, and queries a third-party weather database to obtain weather conditions parameters that are used in part by the remote processor to determine the state or particle load filter element.

In some such embodiments, the remote server can send filter element analysis data and data from the scanned tag to be added to an environmental parameter database.

In some embodiments, the remote server can transmit filter element analysis data to be displayed on a local computing device via the wireless network, which can be a smartphone, personal computer, a simple display, etc.

It will also be appreciated that a method of analyzing a filter element using the aforementioned alternative system is contemplated herein wherein the method includes the steps of: scanning a scanable tag affixed to a filter element disposed within a filter housing of a vehicle; transmitting data associated with the scanned tag to a remote server, wherein the remote server is comprised of a remote processor and non-transitory computer-readable medium; transmitting environmental information about the vehicle to the remote server; and determining the filter element analysis based on the data associated with the scanned tag, the environmental information, and an environmental parameter database.

In some such embodiments, the method can include the optional step of recording the filter element analysis, the scanned tag data, and the environmental information to the environmental parameter database.

In some such embodiments, the environmental information can be selected from humidity, temperature, wind speed, crop type, soil type, location, altitude, and soil moisture level.

In yet additional embodiments, the method can include the step of obtaining vehicle operating parameter information, wherein the vehicle operating parameter information is further included in the determining the filter element analysis step.

In some embodiments, a portion of the environmental information can be automatically detected through use of one or more sensors. Alternatively, or additionally, a portion of the environmental information can be automatically obtained via a third-party database, wherein the remote server obtains location information regarding the filter element, sends the location information to the third-party database and retrieves environmental information from the third-party database based on the location.

In some embodiments, the filter element analysis can be transmitted from the remote server to a local computing device for displaying the filter element analysis results.

It will be appreciated that the determination step can provide an estimated time until cleaning or an estimated time until replacement.

In yet another embodiment of the present invention a filter element cleaning and replacement recommendation system is contemplated which includes: a remote server having a remote processor and non-transitory computer-readable medium that is configured to receive local information from a plurality of locations via a network, the local information including: filter element information retrieved from one or more sensors associated with the filter element; environmental information retrieved either by local sensors or through a third-party database based on the location of the filter element, and vehicle associated information; and a filter element, environmental, and vehicle database configured to store historical information associated with a plurality of filter elements, local environmental conditions, and vehicle operating parameters; wherein the remote processor is configured to analyze the plurality of localized filter elements, environmental, and vehicle associated information along with the historical information to determine for a particular local filter element a cleaning and replacement recommendation.

In yet another embodiment of the present invention filter element cleaning and a replacement recommendation system is contemplated which can include: a remote server having a remote processor and non-transitory computer-readable medium that is configured to receive local information from a plurality of locations via a network, the local information including: 1) filter element information retrieved from one or more sensors associated with the filter element; 2) environmental information retrieved either by local sensors or through a third-party database based on the location of the filter element, and 3) vehicle associated information; and 4) a filter element, environmental, and vehicle database configured to store historical information associated with a plurality of filter elements, local environmental conditions, and vehicle operating parameters; wherein the remote processor is configured to analyze the plurality of localized filter elements, environmental, and vehicle associated information along with the historical information to determine for a particular location a recommended filter element type, and an associated recommended cleaning and replacement schedule.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It will be appreciated that the various components can transmit data in accordance with IEEE 802.11a/b/g/n standard, generally referred as a WIFI transceiver. Additionally, the various components can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, BLUETOOTH, and the like without departing from the scope and intent of the present disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein.

DETAILED DESCRIPTION OF THE INVENTION

It will be appreciated by those having skill in the area of internal combustion engines, harvesting, motors, etc. that proper filtration of lubricants as well as air can increase the life of particular motor greatly by reducing dust buildup and other contaminants from interfering with the operation of the machinery or vehicle.

Figure 7:
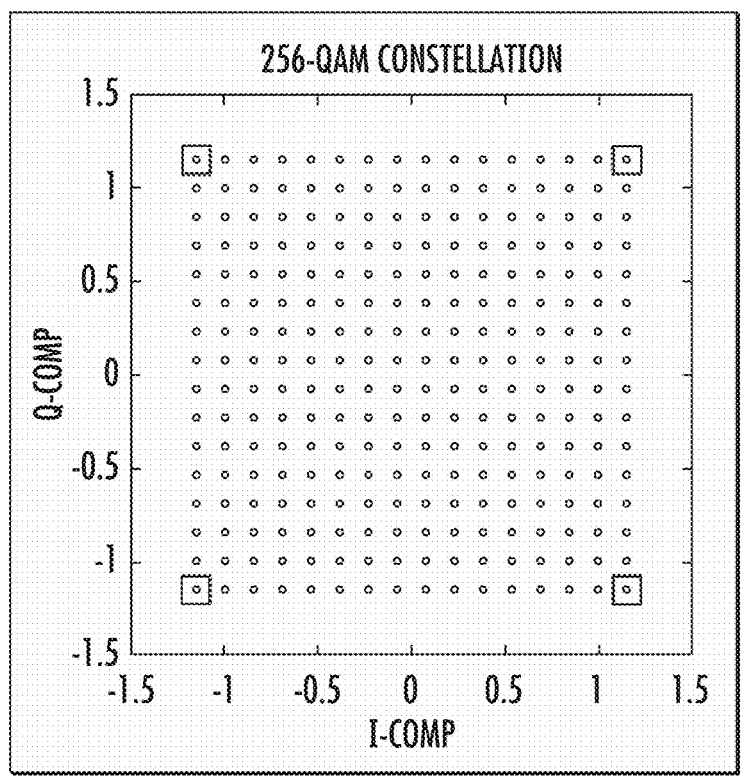
FIG. 7 illustrates an exemplary flow chart depicting various steps of methods of implementing the system as outlined above.
Figure 8A:
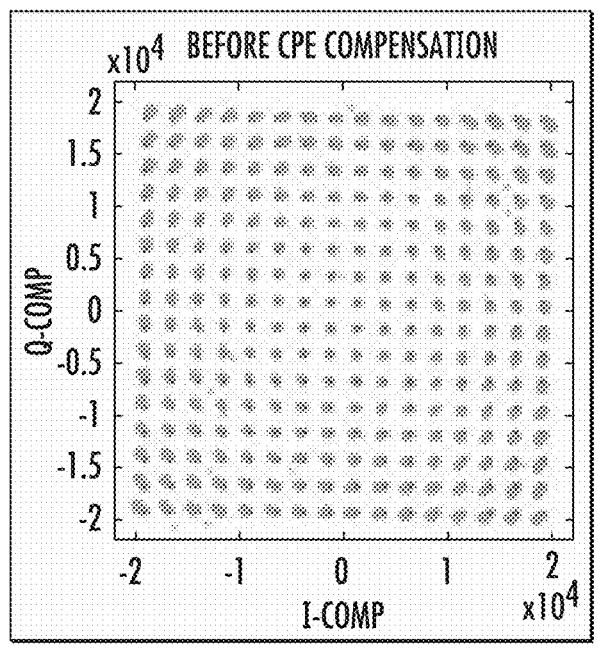
FIG. 8 illustrates an exemplary flow chart depicting additional filter element analysis methods.
Figure 8B:
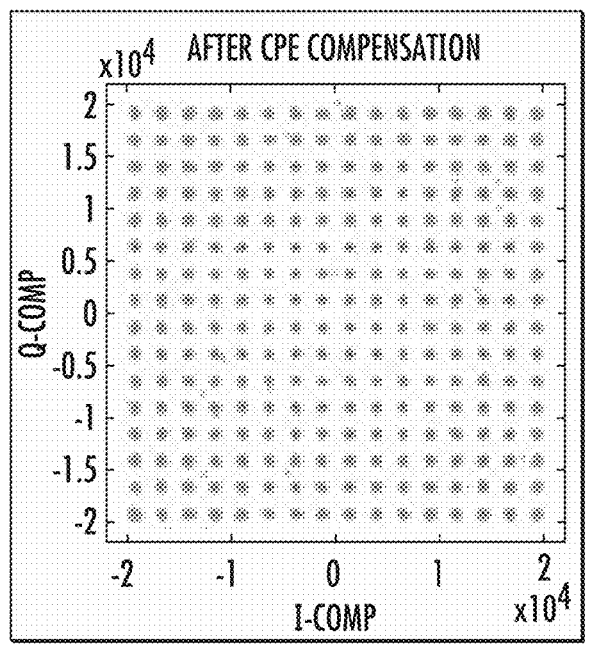
Figure 8C:
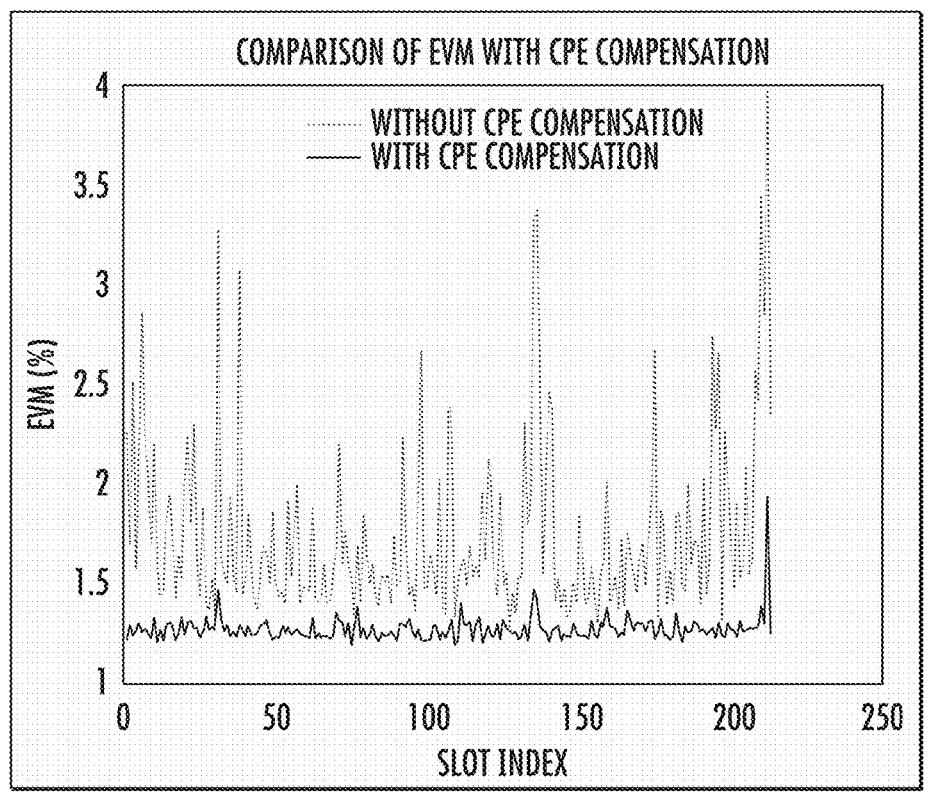
Figure 9:
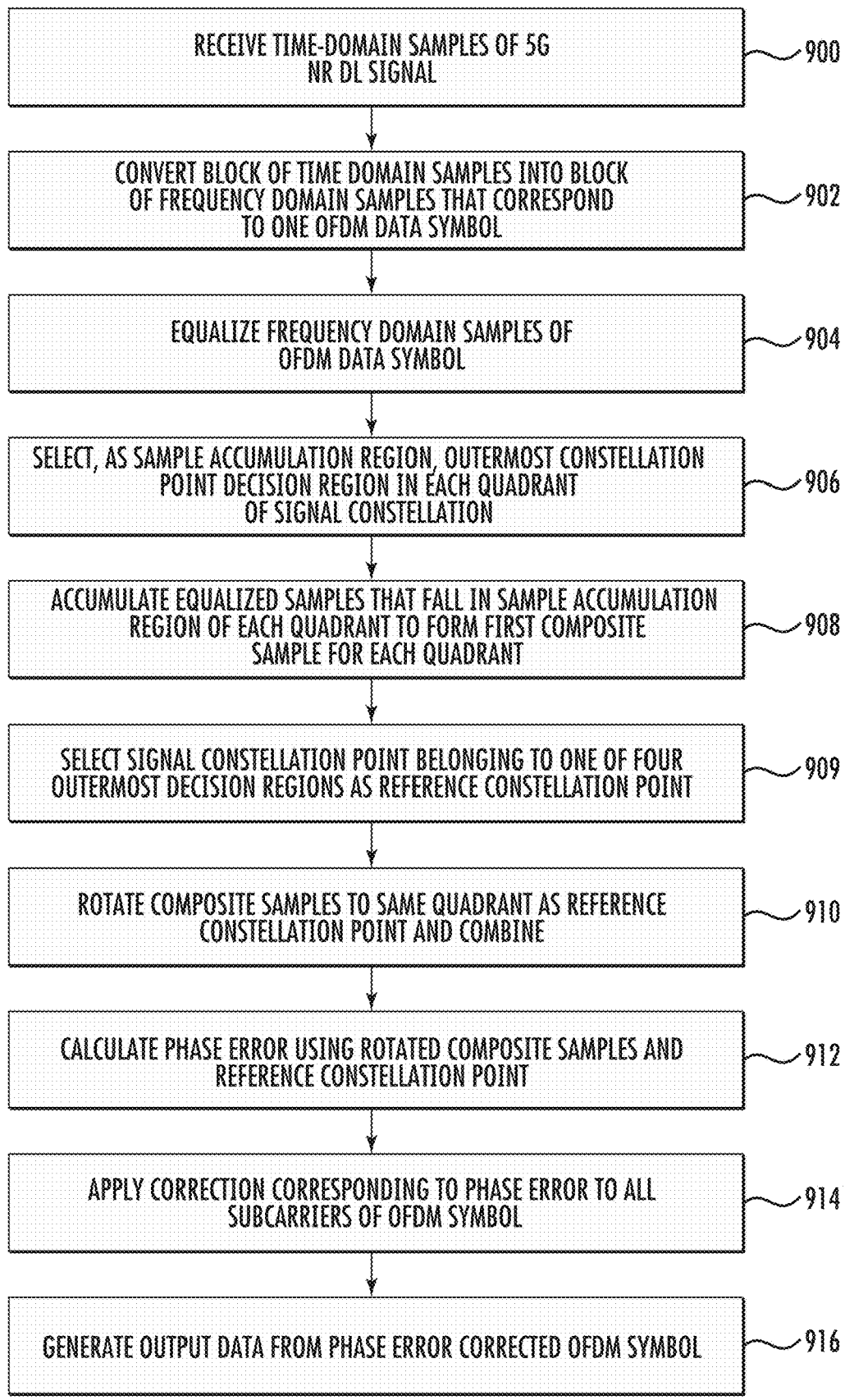
FIG. 9 Illustrates an exemplary flow chart determining a maintenance recommendation based on filter element analysis methods.
Figure 1:
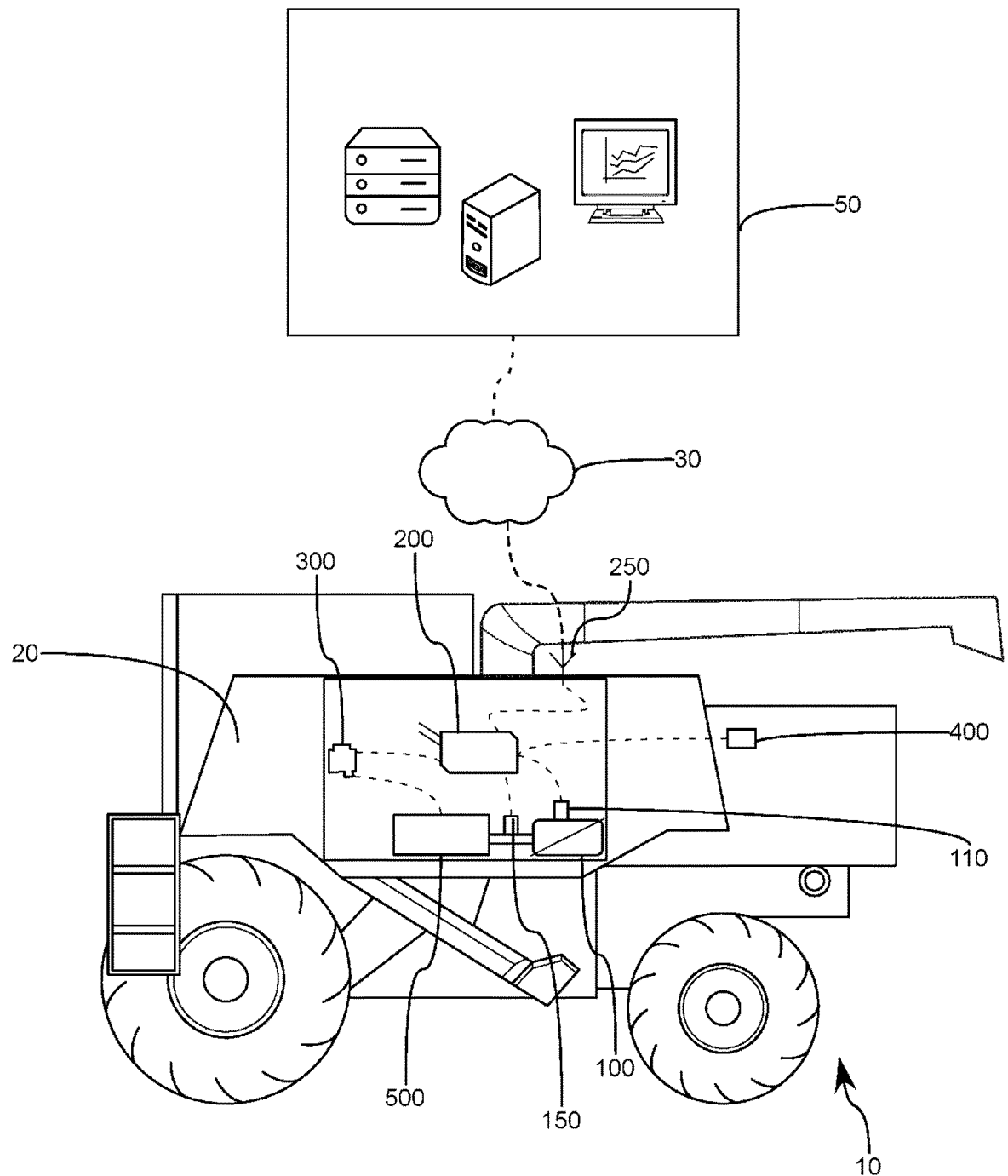
Figure 2:
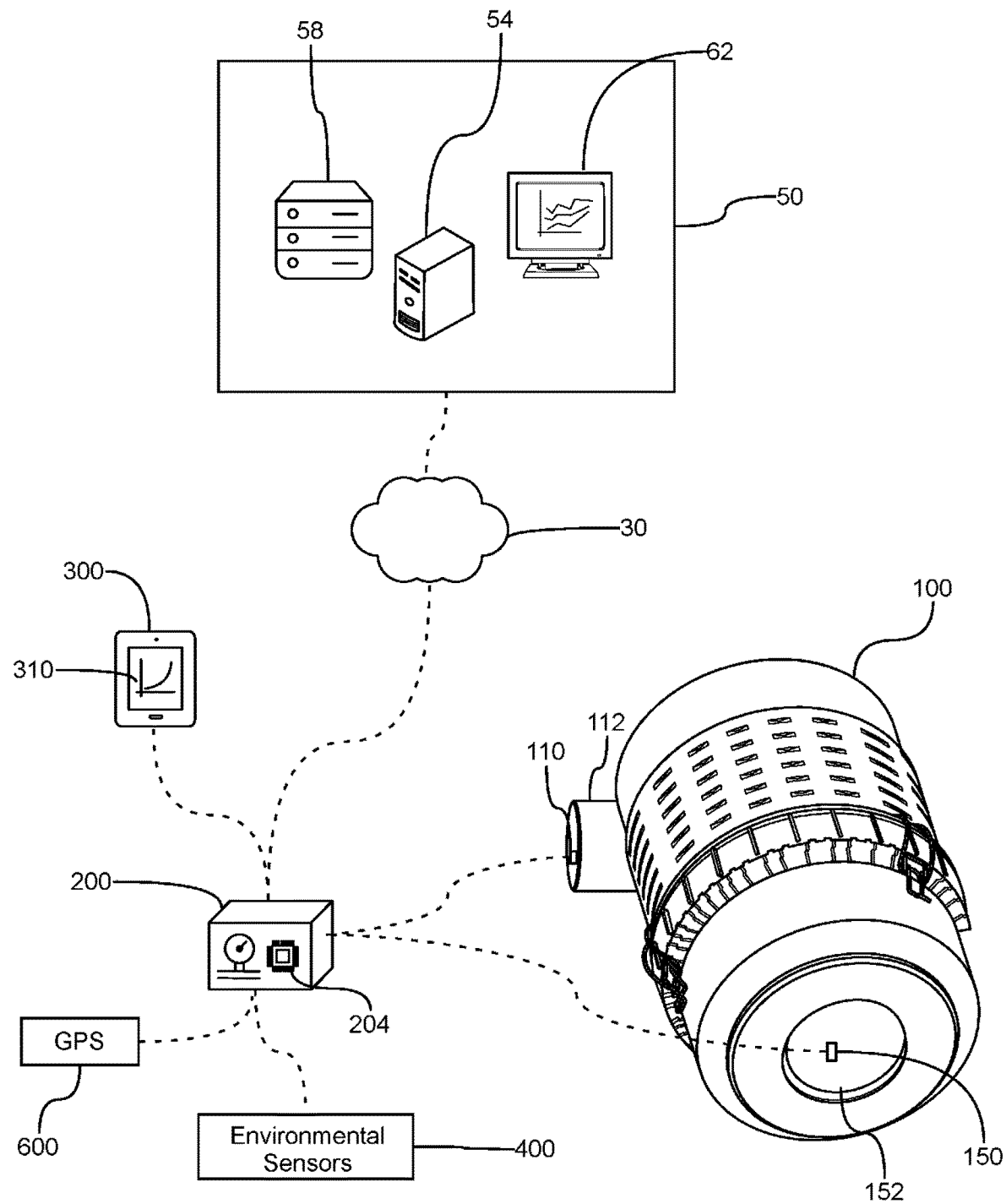
Figure 3:
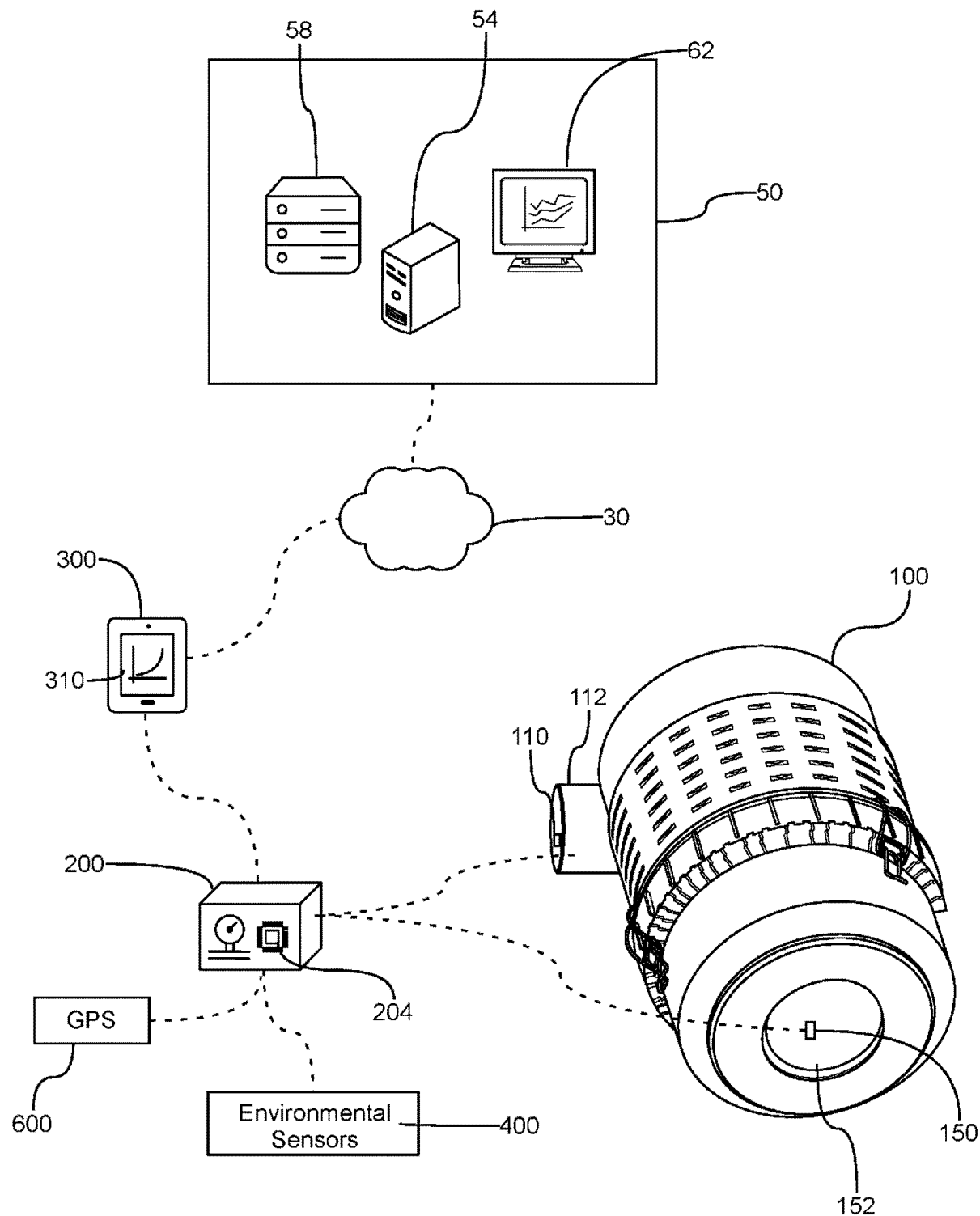
Figure 8:
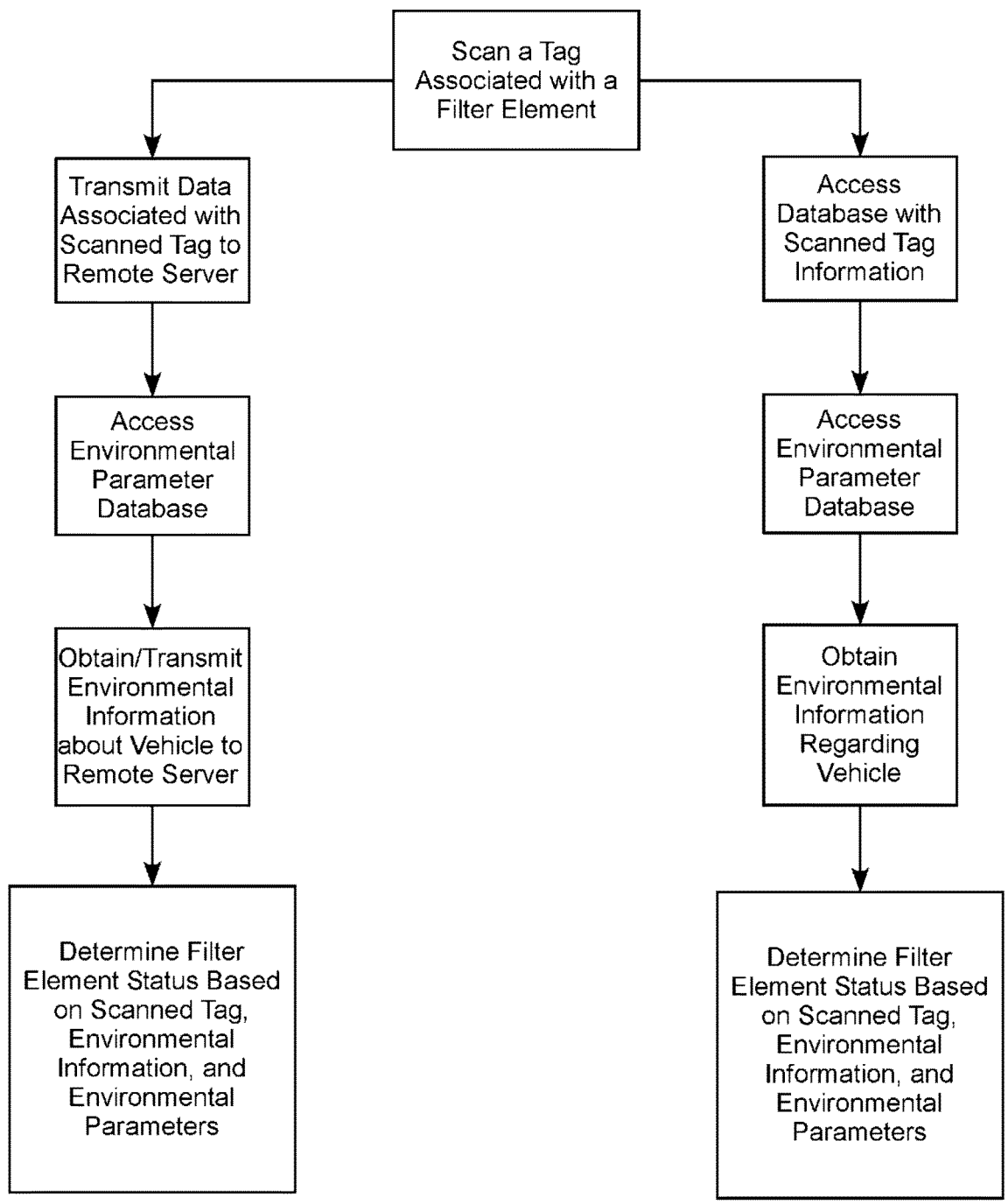
Figure 9:
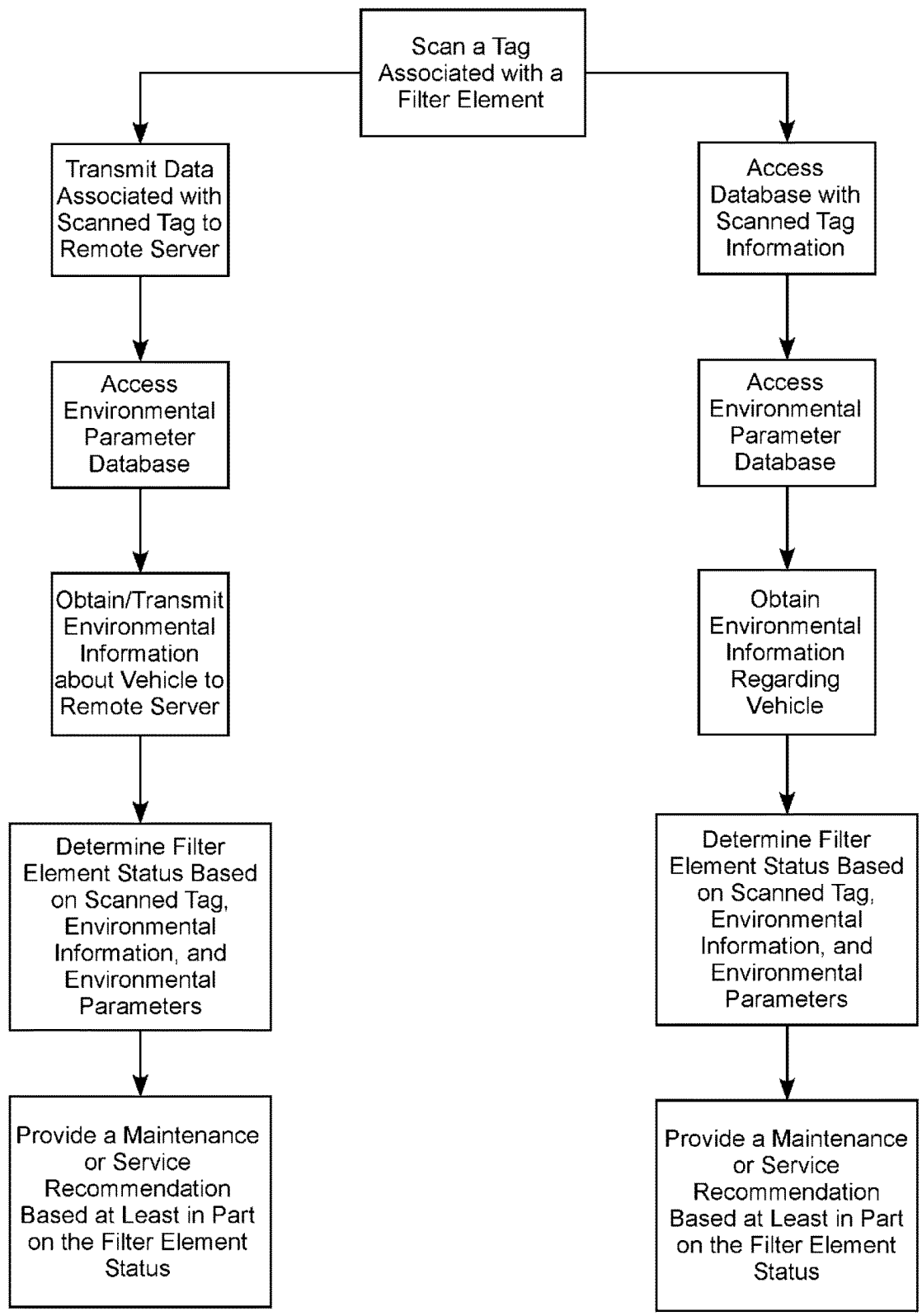

In order to aid in the protection of these systems, as well as the maximization of operation time and reduction of cost, a filter element analysis system 10, as shown in FIGS. 1-6, is contemplated herein which is configured to aide in the proper timing and scheduling of filter element cleaning and maintenance, particularly within equipment systems operating in widely ranging conditions, for example farming or harvesting equipment wherein the conditions are largely dependent on locational and environmental conditions. Methods for determining a filter element analysis or predictive maintenance analysis are shown in FIGS. 7-9.

As discussed above, particulate counts in a given stream can vary greatly depending various environmental factors. In the instance of air filtration, for example, particulate or contaminant density can vary greatly between various crop types, soil types, various weather conditions, or any number of additional factors.

It will also be appreciated that these types of systems often include large and robust air filtration systems with one or more filter elements which can be expensive to both clean and/or replace. Additionally, cleaning operations can often lead to unintentional damage and thus require premature replacement of these large filter elements which is a source of undue cost. For example, a user may be required to remove the filter element and either provide a reverse flow of fluid or air through the system, for example, by blowing air backwards through the filter element using an air compressor and nozzle. However, oftentimes in the field, if a replacement filter element is not readily available, the user may just remove the filter element temporarily and strike the filter element against something so as to dislodge as much of the contaminant contained within as possible prior to re-inserting the filter element and resuming operation.

Additionally, changing the filter elements too often can result in large amounts of wasted man hours and crop waste due to unnecessary equipment downtime.

As discussed above, the filter element analysis system 10 of the present invention will be discussed primarily with regard to air filter elements for purposes of illustration, however, it will be appreciated that other filter elements, such as oil or other fluid filter elements, can similarly benefit from various aspects of the present invention. Therefore, aspects of the present invention can be similarly applied to other filtration systems in various environments, including HVAC and other equipment filtration or fluid filtration systems.

Accordingly, the filter element analysis system as contemplated herein can thus include a filter element 104, the filter element being provided within a filter housing 100 being provided in a system such as a vehicle or other equipment 20. The filter housing 100 can include an inlet 112 and an outlet 152, the inlet 112 receiving a contaminated stream medium, i.e. dirty air, and the outlet 152 providing a filtered stream medium, i.e. clean air. One or more filter sensors 110 or 152 can then be provided within or about the filter housing 100, each sensor being configured to generate a signal correlating to various filter element parameters.

The system 10 can also include a location determination mechanism 600, such as a GPS or user input interface, such as control unit 300, for inputting location information. The location determination mechanism 600 can then be configured so as to provide location information regarding the vehicle.

In some embodiments, the GPS can provide location information which can provide the system with the ability to perform real-time fleet tracking, fleet management, and arrange for automatic replenishment and/or delivery of replacement filters as needed, to a target location of the vehicle needing the filter. The GPS information can also be recorded and time stamped, which can later be displayed as an activity log through an interface such as smart device or secondary control unit 300.

The system 10 can also include one or more control units 200 or 300, at least one primary control unit 200 having, or being operatively connected to, a processor or processing unit 204 and a wireless communication mechanism 250 configured to transmit information over a wireless network or cloud service 30. In such an embodiment, the processing unit 204 can be configured to receive the filter element parameters from the one or more filter sensors and transmit the filter element parameters using the wireless communication mechanism 250 to a remote server 50. The remote server 50 can include a remote processing unit 54, and a non-transitory computer-readable medium 58 capable of storing the data received. The remote server 50 can then receive one or more environmental parameters correlating to an environment surrounding the vehicle or equipment 20. The remote server 50 can also receive the filter element parameters from the control unit 200 over the wireless network 30 and, using both the filter element parameters and environmental parameters, determine a state or particle load of the filter element 104. Once the state or particle load of the filter element 104 is determined, it can be transmitted back to the one or more control units 200 or 300.

Figure 1:
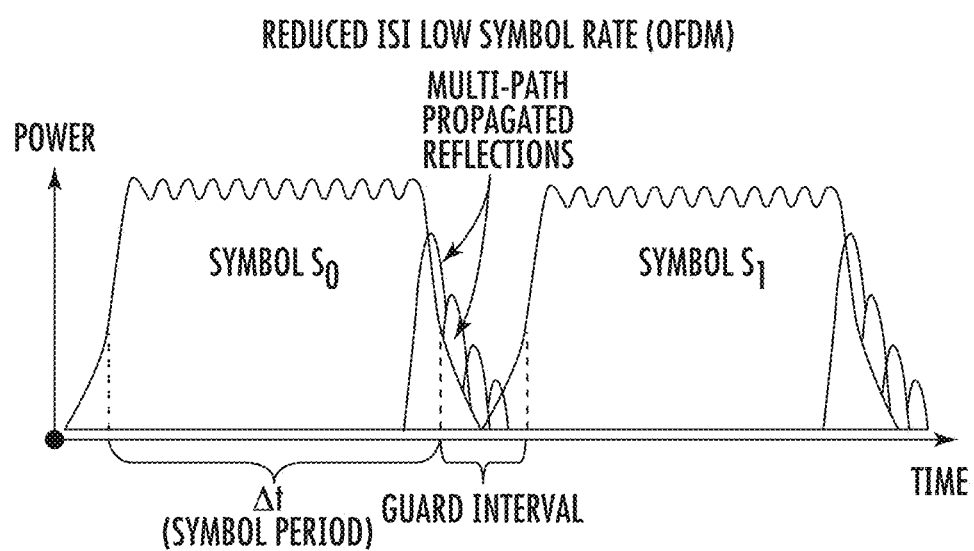
FIG. 1 illustrates an exemplary schematic of a filter element monitoring system in accordance with various aspects of the present invention as implemented on an exemplary piece of equipment.
Figure 2:
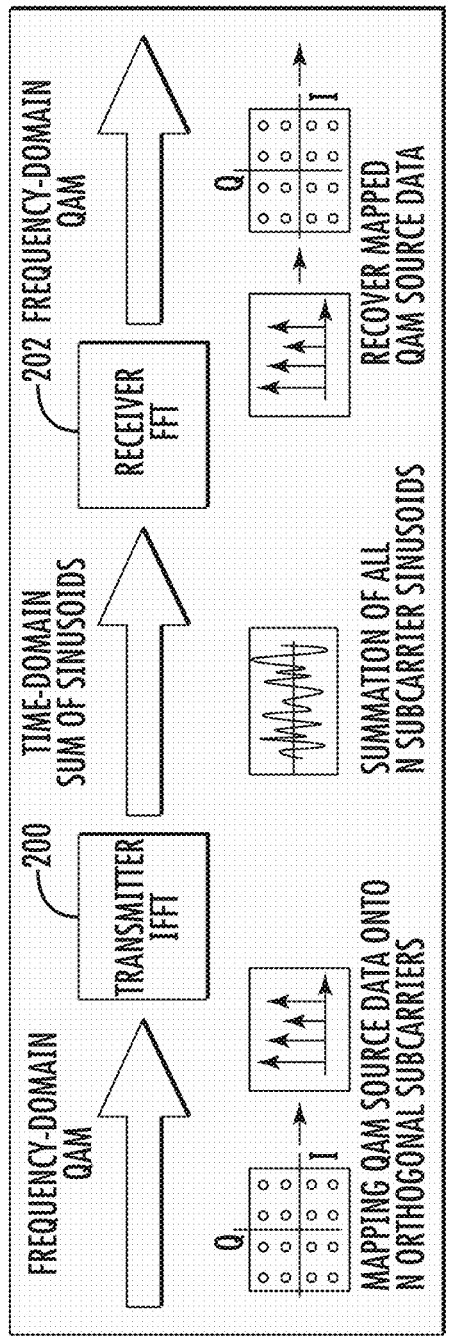
FIG. 2 illustrates another exemplary schematic of a filter element monitoring system in accordance with various aspects of the present invention as implemented with a generic filter element and associated housing.

In some embodiments, a secondary control unit 300 can be provided as an interface located within the cockpit or about filter housing 100 which can include a display configured to display information regarding the state or particle load of the filter element 104. In some such embodiments, and as shown in FIG. 2, the secondary control unit 300 can be provided as a smart device which communicates directly with the primary control unit 200. In this manner, the operator can have constant access to filter element status, remaining filter life, or particle load information in the cockpit or while working around the machinery.

Figure 3:
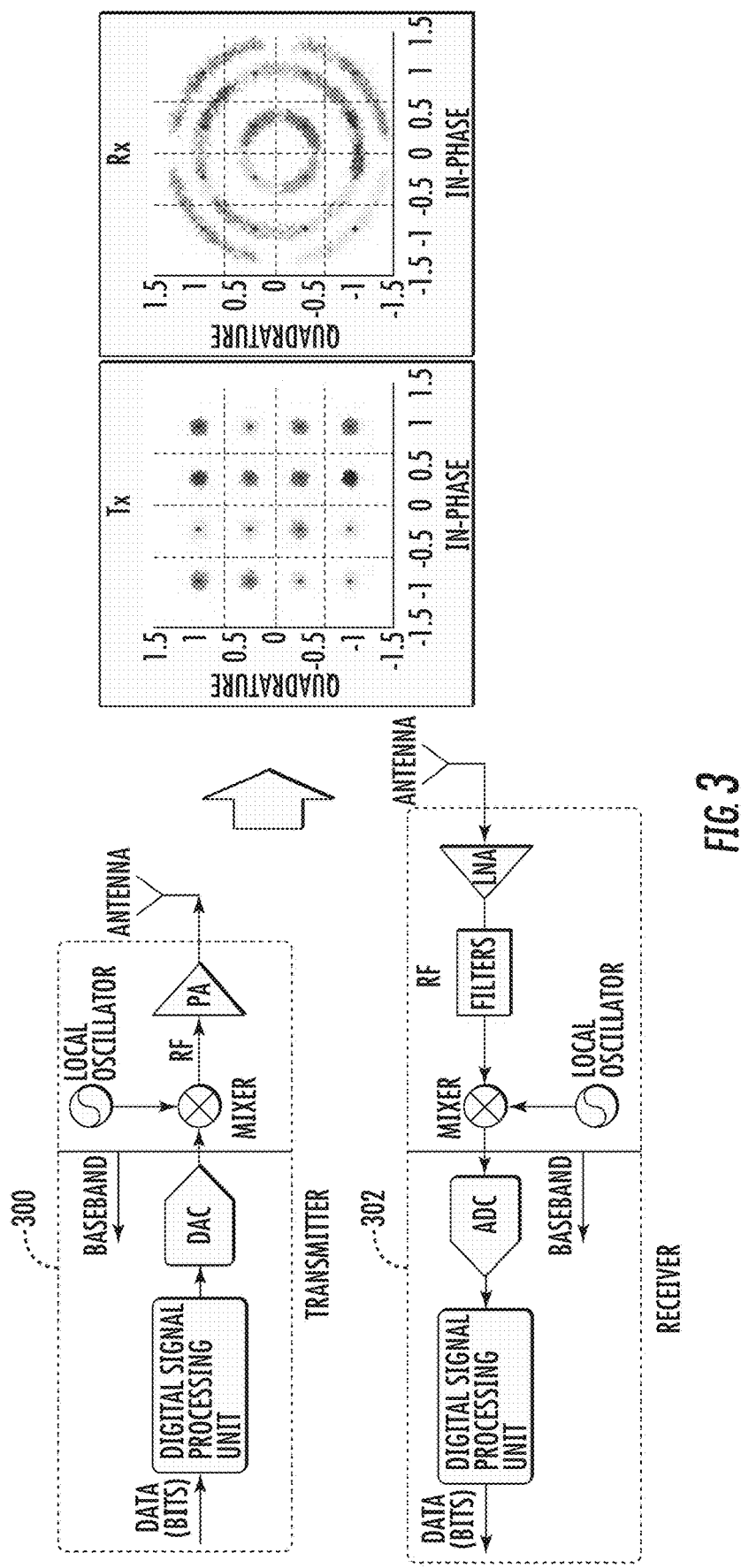
FIG. 3 illustrates yet another exemplary schematic of a filter element monitoring system in accordance with various aspects of the present invention as implemented with a generic filter element and associated housing.
Figure 4A:
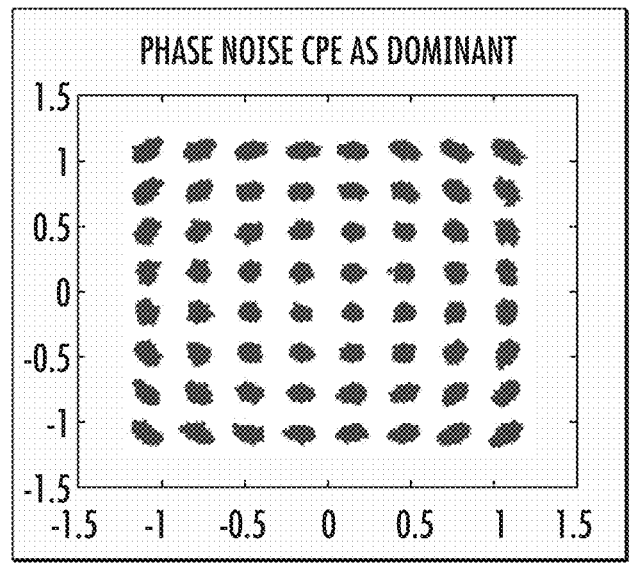
FIG. 4 illustrates yet another exemplary schematic of a filter element monitoring system in accordance with various aspects of the present invention as implemented with a generic filter element and associated housing.
Figure 4B:
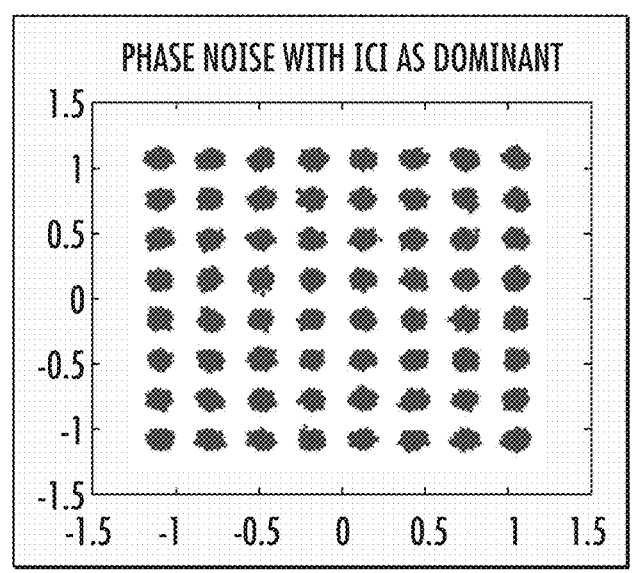
Figure 5:
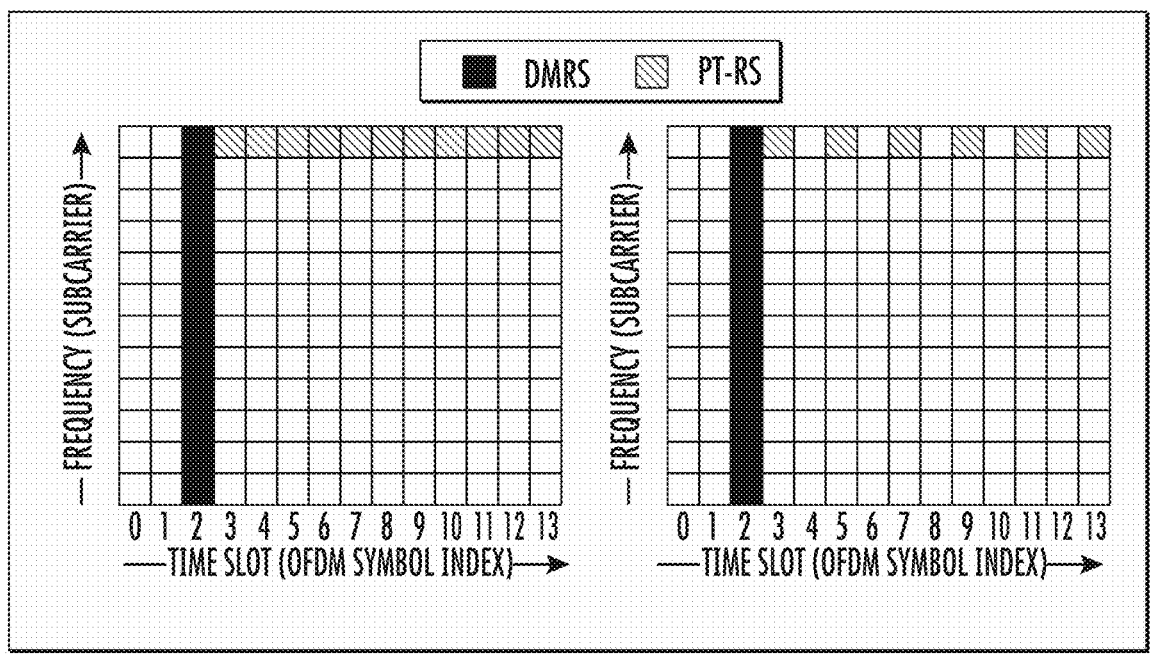
FIG. 5 illustrates yet another exemplary schematic of a filter element monitoring system in accordance with various aspects of the present invention as implemented with an alternative generic filter element and associated housing.
Figure 6:
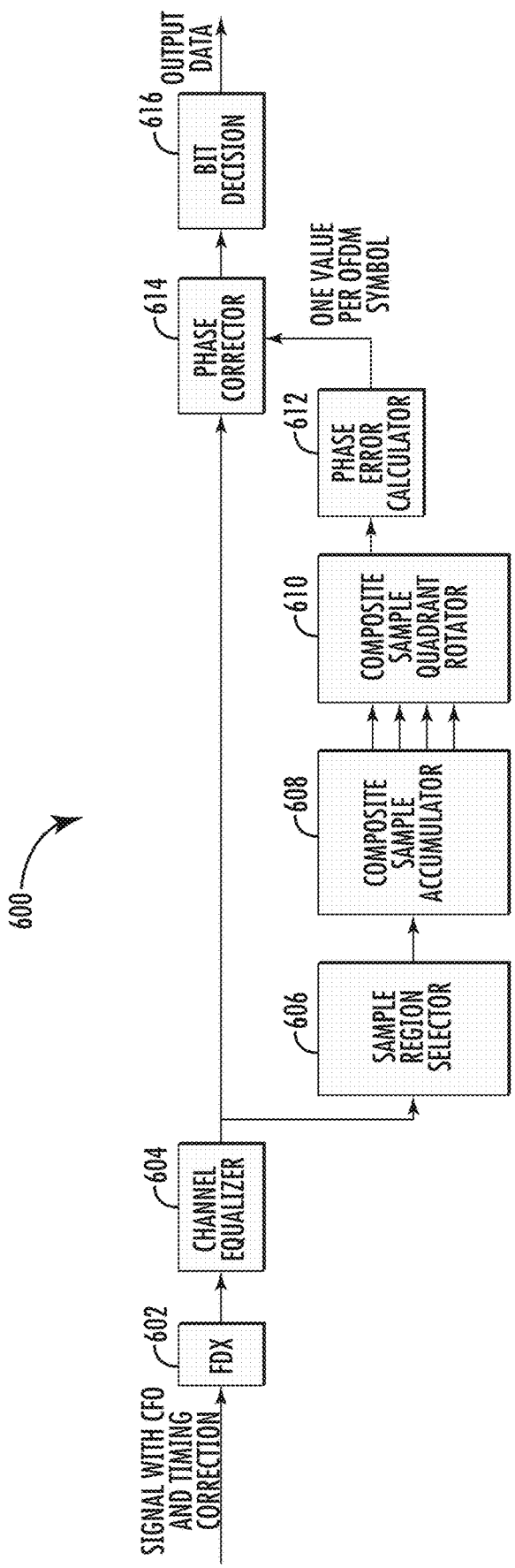
FIG. 6 illustrates an exemplary schematic of an alternative filter element monitoring system in accordance with various aspects of the present invention as implemented with a generic filter element and associated housing.
Figure 4:
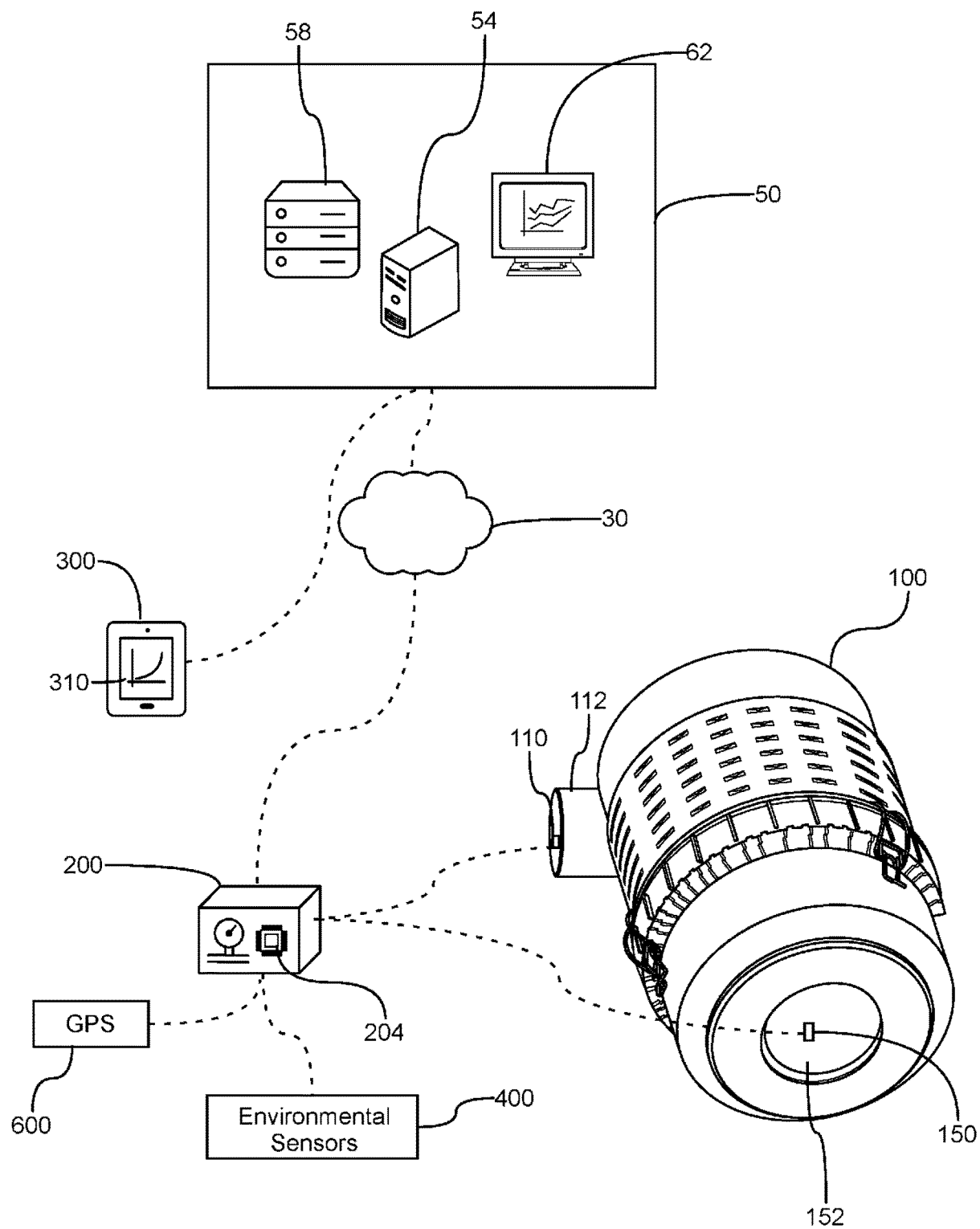
Figure 5:
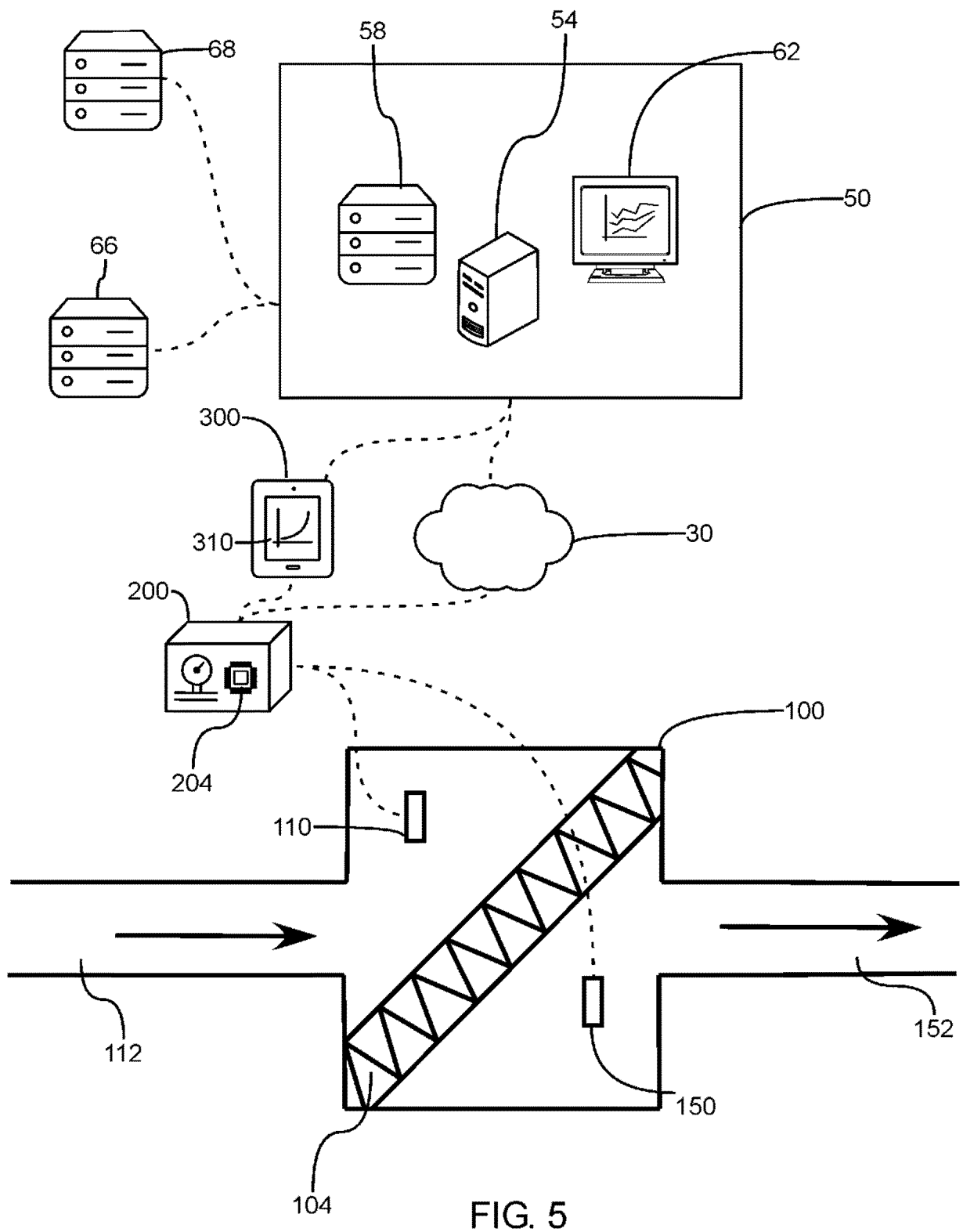
Figure 6:
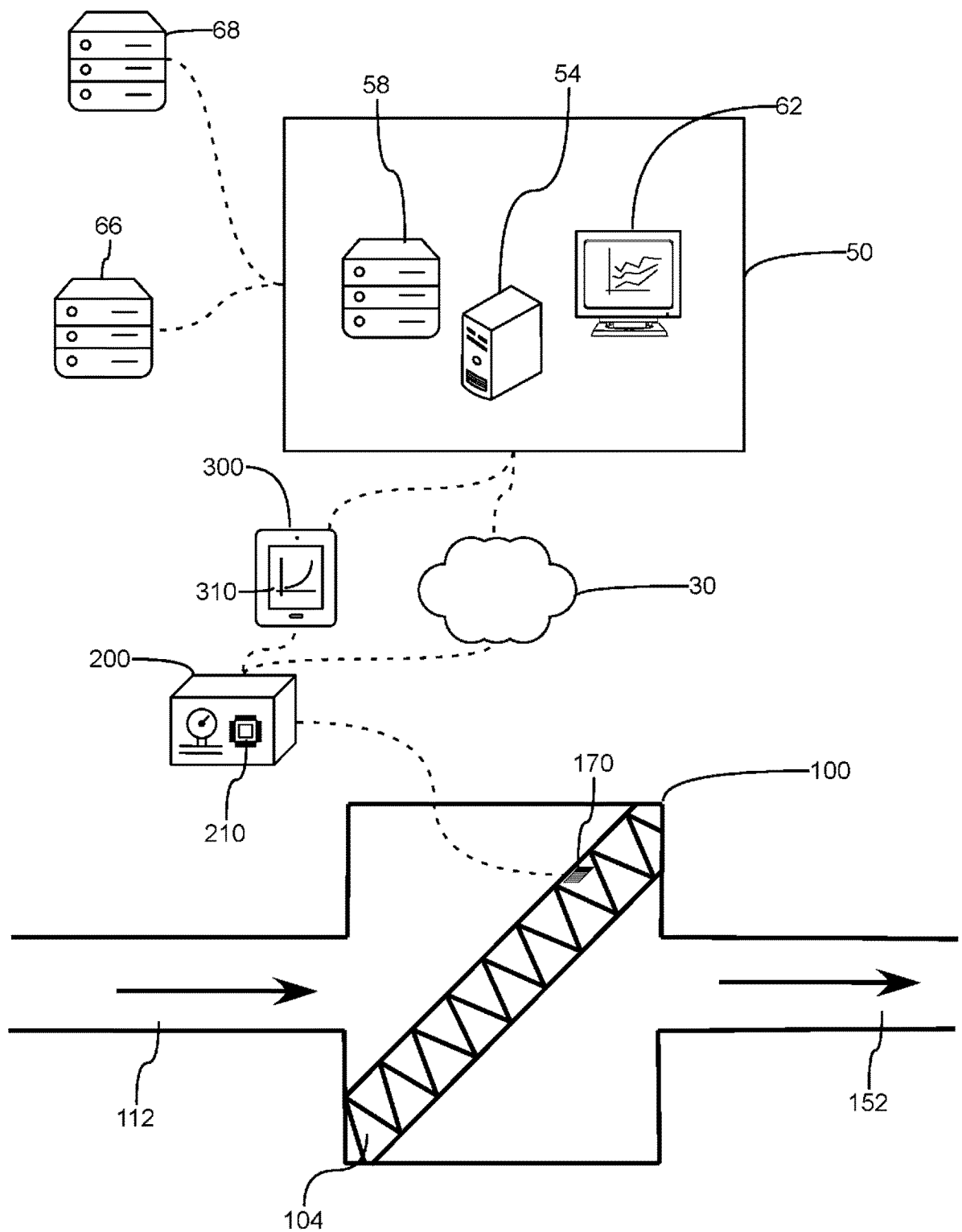
Figure 7:
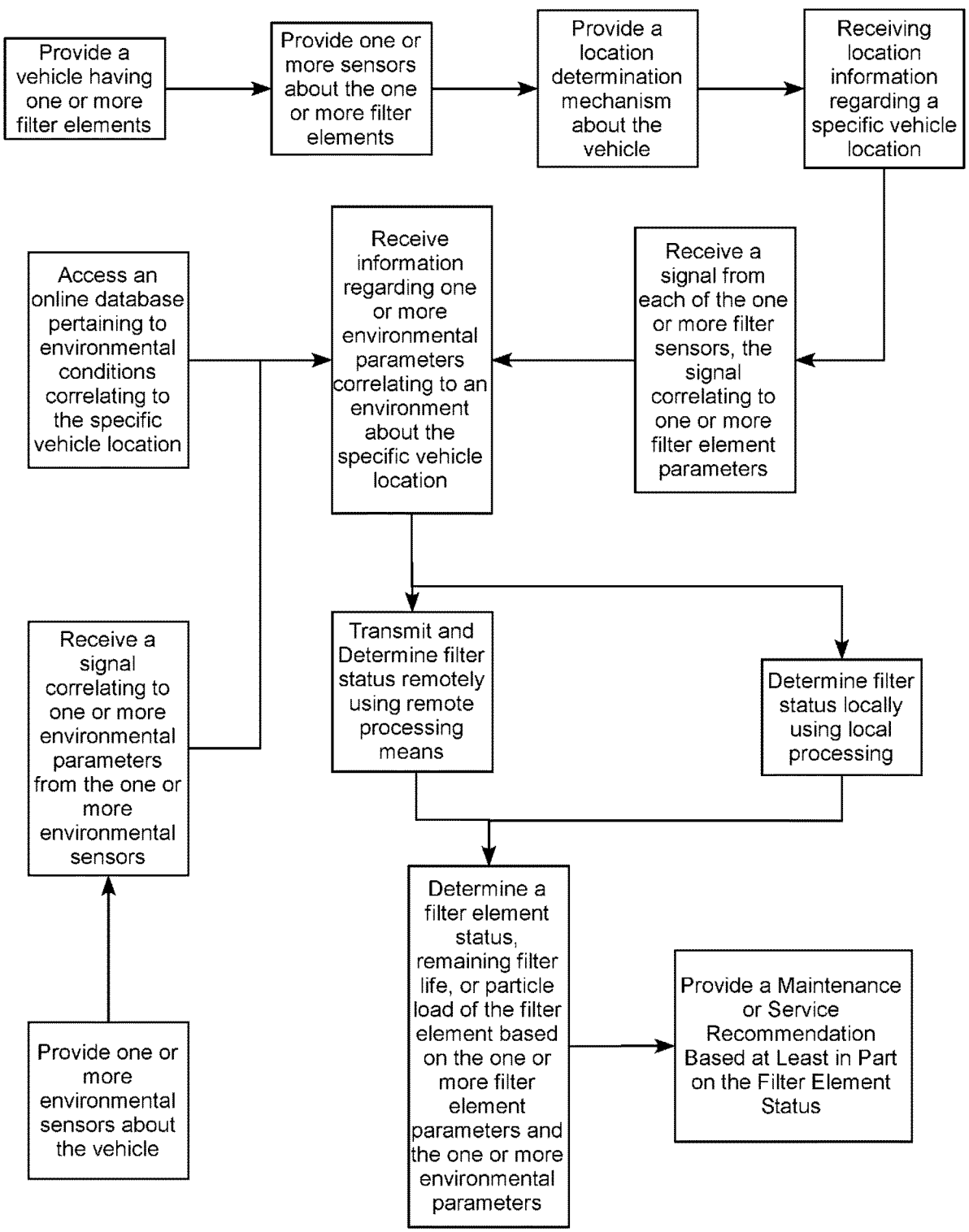

In some such embodiments, the primary control 200 unit can be operatively connected to the secondary control 300 unit utilizing wireless communication, and the secondary control unit 300 be configured to transmit the filter element parameters to the remote server, as shown in FIG. 3. In some alternative embodiments, the primary control unit 200 can be operatively connected to the remote server utilizing wireless communication, and the secondary control unit 300 can be operatively connected to the remote server utilizing wireless communication, wherein the secondary control unit is configured to receive and display the information regarding state or particle load of the filter element, as shown in FIG. 4.

In some such embodiments, as discussed above, the secondary control unit 300 can be provided as a mobile smart device provided with a mobile application loaded thereon, wherein the mobile smart device can receive user input and communicate wirelessly with the primary control unit 200 either directly, through a wireless communication network, over an internet connection, or through the remote server 50, in any combination or sub-combination. The application loaded on to 300 can also provide an interface for viewing activity logs, receiving alerts and other notifications. These notifications can be received as a push notification or manually retrieved as requested by the user through the application. The application can be used to display historical information, predictive maintenance information, remaining life information and comparative information sorted by filter type, environmental parameter type, and/or vehicle type. This comparative information is retrieved from a server that collects data from a plurality of filters, vehicles and their usage under identified environmental parameters.

In some alternative embodiments, the remote server 50 can utilize the global position of the filter element 104 to access desired environmental parameters from an online database. Some examples can include weather database information regarding present or recent rainfall, humidity, wind speed, etc. for a given location. In some similar embodiments, various environmental conditions can be obtained by providing one or more environmental sensors 400 about the vehicle or equipment 20. The one or more environmental sensors 400 can then be configured to provide a signal correlating to at least one environmental parameter about the environment in the direct vicinity of the equipment to the remote server through the one or more control units, etc.

It will also be appreciated that the various sensors, either environmental 400, or filter sensors, 110 or 150, can be configured to transmit their respective signals to the one or more control units, 200 or 300, utilizing wireless communication. It will also be appreciated that equipment status sensors 500 can also be placed about the vehicle to detect parameters relating to usage, such as engine speed, efficiency, vehicle speed, etc. which factors can all be used as weighting factors for determining state or particle load of the filter element 104. Such sensors can be connected to the control unit 200 through OBD connections, or through alternative connection means to the vehicle or equipment controller devices as appropriate.

In yet additional embodiments the one or more control units can include a user input interface 310, wherein the user input interface 310 can be configured to receive one or more environmental parameters or filter element parameters from a user or operator. Some exemplary parameters which can have an effect on filter element characteristics and be readily input by the user can include a vehicle activity, engine or motor run times, crop type, soil type, soil water content, soil PH-levels, visual filter element state or particle load, sound, vehicle responsiveness, or any number of other parameters as will be appreciated by those having skill in the art.

In yet additional embodiments, the primary control unit 200 can also include a local non-transitory computer-readable medium 58 configured to store historical data regarding service life information being calculated based on one or more alternative filter elements with similar associated filter element parameters or working conditions correlated to each of the alternative filter elements. It will be appreciated that network connectivity can often be lost in numerous working situations, such as harvesting a crop in a remote location. In such instances, the primary control unit 200 can be configured to access a most recent version of a determination algorithm performed by a local processor provided therein for determining filter element status and particle load and can thus the system 10 can utilize locally available input and sensed data so as to provide a best approximation regarding filter element replacement guidelines or time frames.

In the various embodiments, local sensors provided about the equipment or filter element can include pressure sensors, accelerometers, flow sensors, strain sensors, humidity sensors, air-mass flow, temperature, particle counter, turbulence sensor, spectrometry, sound, vehicle operation parameters, and optical sensors.

Also contemplated herein is a method for analyzing a filter element within a vehicle, the method including various steps such as: providing a vehicle 20 having one or more filter elements 104; providing one or more filter sensors 110 or 150 about the filter element 104; providing a location determination mechanism 600; receiving a signal from each of the one or more filter sensors 110 or 150, the signal correlating to one or more filter element parameters; receiving location information regarding a specific vehicle location; receiving information regarding one or more environmental parameters correlating to an environment about the specific vehicle location; and determining a state or particle load of the filter element 104 based on the one or more filter element parameters and the one or more environmental parameters. In some such embodiments, the filter element parameters can be transmitted to a remote server 50 over a wireless network 30, wherein the determination of the state or particle load is calculated remotely by the remote server 50. It will be appreciated that the remote server can include a remote processing unit or means 54, a remote non-transitory computer-readable medium 58 for storing current and historical data, and a display or access portal 62 for accessing the remote processing unit 54 and data storage means 58.

FIG. 7 illustrates methods of determining the status of a filter element as described above as well as maintenance or service recommendation associated thereof.

In some alternative such embodiments, the filter element parameters can be utilized to be determine the state or particle load locally by the one or more control units 200 or 300 and wherein the parameters resulting in the determination steps are later transmitted to the remote server 50 for storage and use in an updated analyzation of an updated algorithm wherein periodic updates to the algorithm are used by various local control.

It will be appreciated that while the user input interface has been primarily discussed as a local smart device operating as a secondary control unit 300, however, input and display means can be provided at various optional locations including a control or notification panel in the cockpit of the vehicle 20, about the primary control unit 200, which could be located near the filter housing 100, or virtually at any suitable location using any suitable input means. In such instances, the user input can be utilized in order to receive one or more of the environmental parameters from a user through the user input interface. The benefit being that various factors which might have an effect on filter element life and performance can include various factors which can be easily ascertained by a user, but which are harder to detect using sensors, for example crop type, soil information, etc.

However, other environmental factors may be readily ascertained using sensors, as such, the method can include the steps of providing one or more environmental sensors 400 about the vehicle 20; and receiving a signal correlating to one or more environmental parameters from the one or more environmental sensors about the vehicle.

In yet additional embodiments, the method of analyzing a filter element within a vehicle can include the steps of providing a display; and transmitting the determined state or particle load of the filter element to the display from the remote server over a wireless network. In other words, the mobile device can be utilized to provide alerts, which can include indications that a particular filter needs service or replacement, or the alert can be a projection regarding filter element life approximations which can be delivered to the user using mobile networks to a smart device, or transmitted to a display in the cockpit of the vehicle, etc. As such, the user can then decide whether to change the filter element prior to starting the day, or whether use can be continued until the next natural work break, etc.

It will then be appreciated that the system can be configured to create and save activity logs regarding vehicle history, engine run times, usage history, GPS location with time stamps, activity logs, and associated parameters such that a database regarding filter performance, predictive maintenance and life can be generated and analyzed for the life of the filter element in a given vehicle, and in some instances for a plurality of filter elements in a plurality of vehicles so as to increase the accuracy of filter life predictions, filter maintenance and filter performance over the filter life based on a given set of environmental parameters, vehicle type, and/or filter element type including filter media type used in a given filter element(s).

In some additional embodiments contemplated herein, an alternative filter element analysis system for a vehicle 20 can be provided which can include a filter element 104; a filter housing 100; a scanable tag 170 affixed to either the filter element 104 or filter housing 100. Then a scanning and input device can be utilized, which can be either an optical or RF scanner readily available on numerous smart devices, and configured to obtain data from scanning the scanable tag 170.

The data from the scanable tag 170 can then be transmitted to a remote server 50, which is configured to receive scanned and input information from the scanning and input device 300 via a wireless network 30. The remote server 50 can then be configured to provide a filter element analysis and determine filter element status, remaining filter life, or particle load based on the data retrieved from the scanned tag and an environmental parameter database 66 which can be in communication with the remote server 50.

In some such embodiments, the alternative filter element analysis can be based on user input information into the scanning and input device, i.e. smart device 300. Such input can include, environmental attribute information such as humidity, temperature, wind speed, jet stream, wind gusts, pollen levels, crop type, soil type, location, altitude, and soil moisture level. The user can also input information regarding visual or user experience information such as filter element state, remaining filter life, or particle load appearance, sounds, vehicle responsiveness, or other parameters best recognized by a user and are difficult to ascertain using sensors.

In some such embodiments, the scanable tag 170 can include: a barcode, a QR code, a passive RFID tag, an active RFID tag, or a NFC tag.

In various related embodiments, the scanning and input device 300 can automatically receive location information, wherein the remote server receives the location information, and queries a third-party weather database 68 so as to obtain weather conditions parameters that are used in part by the remote processor to determine the filter element state, remaining filter life, or particle load.

In some such embodiments, the remote server 50 can send filter element analysis data and data from the scanned tag to be added to the environmental parameter database 66.

In some embodiments, the remote server 50 can transmit filter element analysis data to be displayed on a local computing device 204 via the wireless network, which can be a smartphone, personal computer, a simple display, etc.

It will also be appreciated that a method of analyzing a filter element using the aforementioned alternative system is contemplated herein wherein the method includes the steps of: scanning a scanable tag 170 affixed to a filter element 104 disposed within a filter housing 100 of a vehicle 20; transmitting data associated with the scanned tag 170 to a remote server 50, wherein the remote server 50 is comprised of a remote processor 54 and non-transitory computer-readable medium 58; transmitting environmental information about the vehicle to the remote server; and determining the filter element analysis based on the data associated with the scanned tag 170, the environmental information, and an environmental parameter database 66.

In some such embodiments, the method can include the optional step of recording the filter element analysis, the scanned tag data, and the environmental information to the environmental parameter database 66.

In some such embodiments, the environmental information can be selected from humidity, temperature, wind speed, jet stream location, wind gusts, pollen levels, crop type, soil type, location, altitude, and soil moisture level.

FIGS. 8-9 illustrates a flow chart of implementing a method as described above where the determination of the filter element status can be done remotely after scanning the tag or done locally on a device such as a smartphone with processing means. Data associated with the scanned tag, as noted, can be obtained directly from tag, obtained from a local copy of a database containing information related to the scanned tag, obtained from a remote database or a hybrid thereof. The environmental parameter database can be accessed remotely or stored locally on the processing device. Obtaining environmental information can also be determined locally through manual input, sensor input, obtained remotely from other sources, or a hybrid thereof.

In yet additional embodiments the method can include the step of obtaining vehicle operating parameter information, for example by connecting the control unit 200 to a vehicle system 500 using OBD connections etc., wherein the vehicle operating parameter information is further included in the performance of filter element analysis and the determination of filter element status, remaining filter life, or particle load.

In some embodiments, a portion of the environmental information can be automatically detected through use of one or more sensors 400. Alternatively, or additionally, a portion of the environmental information can be automatically obtained via a third-party database 68, wherein the remote server obtains location information regarding the filter element 104, sends the location information to the third-party database 68 and retrieves environmental information from the third-party database 68 based on the location.

In some embodiments, the filter element analysis can be transmitted from the remote server 50 to a local computing or processor 204 for displaying the filter element analysis results.

It will be appreciated that the filter element status, remaining filter life, or particle load data can then be used in a secondary determination step which can, in conjunction with additional data, be used to provide an estimated time until cleaning or an estimated time until replacement.

In yet another embodiment of the present invention, a filter element analysis system 10 is contemplated which includes: a remote server 50 having a remote processor 54 and non-transitory computer-readable medium 58 that is configured to receive local information from a plurality of locations via a network 30, the local information including: filter element information retrieved from one or more sensors 110, 150 associated with the filter element; environmental information retrieved either by local sensors 400 or through a third-party database 68 based on the location of the filter element 104, and vehicle associated information; and a filter element, environmental, and vehicle database being stored on the remote non-transitory computer-readable medium 58 which is configured to store historical information associated with a plurality of filter elements at various locations, local environmental conditions for each filter element, and vehicle operating parameters for their associated vehicles or equipment; wherein the remote processor 204 is configured to analyze the plurality of localized filter element, environmental, and vehicle associated information along with the historical information to determine a cleaning and replacement recommendation for a particular local filter element.

In yet another embodiment of the present invention a filter element cleaning and replacement recommendation system 10 is contemplated which can include: a remote server 50 having a remote processor 54 and remote non-transitory computer-readable medium 58 that is configured to receive local information from a plurality of locations via a network 30, the local information including: filter element information retrieved from one or more sensors 110 and 150 associated with the filter element 104; environmental information retrieved either by local sensors 400 or through a third-party database 68 based on the location of the filter element 104.

In yet additional embodiments, one or more sensors can be provided at several locations about the vehicle which are individually equipped with wireless transmission devices so as to relay sensor information back to a central transmission device, or the individual sensor units can be individually provided with wireless communication means, such as sim cards, cellular service, 4G LTE, or any other wireless communication means as they become available. In some such embodiments, the various sensor units can be configured to be installed at ports, such as service ports, about the filter elements so as to provide real-time information regarding the status of the particular filter element.

It will be appreciated that as processing and wireless communication technologies advance that the size of the various components is becoming smaller. Those of ordinary skill will further recognized that often pre-existing ports provided in housings or otherwise about a particular filter element often only exist in inconvenient locations, or in tight clearances. As such, while the ability to provide small and reliable sensors, sensor information processing, and communication means directly at a particular port is getting ever easier and as such it will become increasingly easier to supply sensor modules in these locations. However, in instances where the sensor modules cannot presently fit within the tight clearances or sensor ports are inaccessible, the sensor units can also be provided with adapters which can extend to, and connect to, the particular port or ports about the particular filter element and thus allow for displaced connection and convenient placement of the given module. In some embodiments, these adapters can be flexible or rigid hoses or nipples configured to account for the tight clearances or inconvenient location of a suitable port provided about the filter element.

As such, the individual sensor units can be provided with sensor means, processing means, and wireless communication means within a singular sealed housing with a connector portion, such as threads or quick connect, which allows the housing to connect to a port, and thus allow for the sensor to detect parameters regarding flow within an interior portion of the port. The sensor data can be processed locally by a processor, and stored on a non-transitory computer-readable medium, such that in instances wherein the wireless communication means has lost a signal, the data can be stored and later communicated when a signal is obtained or restored.

It will be further appreciated that the sensors can be provided within a portion of the sensor unit, wherein the sensor portion can be sealed from a circuit portion of the sensor unit, such that any fluid from the sensor port cannot enter into the sensor unit and foul or contaminate any of the circuitry contained in the circuit portion.

In yet additional embodiments, the sensors or sensor units can be configured to pair with a system or application using a QR code, RFID, Bluetooth, etc. such that registration of a given device and association with a particular vehicle can be achieved without the need for manual input of serial numbers etc. This can be performed using 2-way or 3-way handshaking functions, etc.

In some embodiments, the housing can be provided with external power as generated by the motor so as to power the sensors, communication means, and processing means of the sensor unit.

In yet additional embodiments, the system can be configured to provide indication means, such as LCD screens, or indicator lights which can provide information regarding filter status, connectivity status, or alert information regarding the particular filter element. This can be achieved using bling patterns, codes, color changes, or any other means which will be appreciated by those having skill in the art. Examples of vehicles include but are not limited to: automobiles, trucks, excavators, tractors, combines, balers (both pulled and self-driving), backhoes, dozers, skid steers, loaders, reapers, harvesters, stationary motors, and so forth.

The filter element status can include detecting whether the filter media is worn, such as thinning in certain areas, blown-out, such as having a hole or enlargement of another aperture that allows the free flow of air, tearing of the filter media, and so forth. The particle load can include detecting a quantity of mass disposed on or in the filter element, or it can be a detection of a restriction of air flow through the filter element, the uniformity or lack thereof of air flow transmitting the filter element, or even a detection of pressure drop below a certain threshold.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

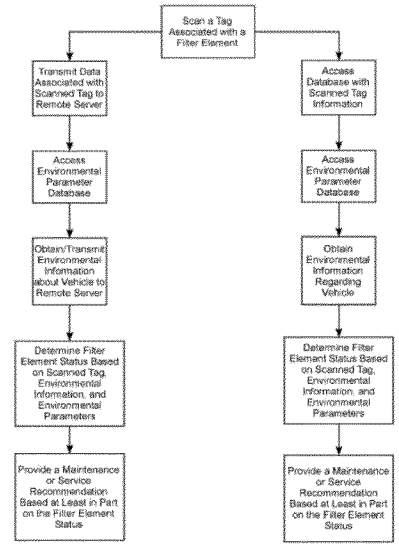

What is claimed:

1. A filter element analysis system for a vehicle, comprising:
    a filter element;
    a filter housing;
    a scanable tag affixed to either the filter element or filter housing;
    a scanning and input device, configured to obtain data from scanning the scanable tag;
    a remote server, configured to receive scanned and input information from the scanning and input device via a wireless network, and an environmental parameter database that is in communication with the remote server via a wireless network, wherein the remote server further comprises a remote processor and non-transitory computer-readable medium; wherein the remote server is configured to determine a particle load of the filter element based on the scanned and input information and information from the environmental parameter database.

2. The filter element analysis system of claim 1 wherein the remote server is configured to receive user input information into the scanning and input device.

3. The filter element analysis system of claim 2, wherein the user input information is environmental attribute information from the list comprising: humidity, temperature, wind speed, wind gusts, jet stream location, pollen levels, crop type, soil type, location, altitude, and soil moisture level.

4. The filter element analysis system of claim 2, wherein the user input information is selected from a list consisting of: a vehicle type, an engine type, a filter system type, a filter element type, and one or more operating conditions.

5. The filter element analysis system of claim 1, wherein the scanning and input device automatically receives location information, and wherein the remote server receives the location information, and queries a third-party weather database to obtain weather conditions parameters.

* * * * *

UNITED STATES PATENT AND TRADEMARK OFFICE
CERTIFICATE OF CORRECTION

| | | |
|---|---|---|
| PATENT NO. | : 11,403,890 B2 | |
| APPLICATION NO. | : 16/818665 | |
| DATED | : August 2, 2022 | |
| INVENTOR(S) | : Hukill et al. | |

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Replace FIGS. 1-9 with FIGS. 1-9 as shown on the attached pages.

Signed and Sealed this
Seventeenth Day of January, 2023

Katherine Kelly Vidal
*Director of the United States Patent and Trademark Office*

(12) United States Patent
Hukill et al.

(10) Patent No.: US 11,403,890 B2
(45) Date of Patent: Aug. 2, 2022

(54) FILTER ELEMENT ANALYSIS SYSTEM AND ASSOCIATED METHODS

(71) Applicant: MANN+HUMMEL GmbH, Ludwigsburg (DE)

(72) Inventors: Brandon Hukill, Holly Springs, NC (US); Jon Nichols, Four Oaks, NC (US); Charles Vaillant, Holly Springs, NC (US); Yew Chong, Singapore (SG); Arpan Penkar, Singapore (SG); Matthew Nunn, Singapore (SG); Andreas Scope, Oberschoena (DE); Kevin Babb, Vicksburg, MI (US); Karlheinz Munkel, Oberderdingen-Flehingen (DE); Markus Beylich, Ludwigsburg (DE); Nicolas Payen, Singapore (SG); Stefan Kunze, Tuebingen (DE); Uwe Plach, Weil der Stadt (DE); Lars-Thorsten Porschke, Bad Liebenzell (DE); Stephan Braun, Markgroeningen (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 16/818,665

(22) Filed: Mar. 13, 2020

(65) Prior Publication Data
US 2020/0380797 A1    Dec. 3, 2020

Related U.S. Application Data

(63) Continuation of application No. 15/705,367, filed on Sep. 15, 2017, now abandoned.

(30) Foreign Application Priority Data

Nov. 23, 2016 (EP) .................................. 16290221

(51) Int. Cl.
G07C 5/00 (2006.01)
G01S 19/24 (2010.01)
(Continued)

(52) U.S. Cl.
CPC .............. G07C 5/008 (2013.01); G01S 19/24 (2013.01); G07C 5/0808 (2013.01);
(Continued)

(58) Field of Classification Search
CPC ..... G01S 19/24; G07C 2205/02; G07C 5/006; G07C 5/008; G07C 5/0808; G07C 5/08;
(Continued)

(56) References Cited

U.S. PATENT DOCUMENTS 5,774,056 A    6/1998    Berry, III et al.
9,322,678 B1   4/2016    Stawitzky et al.
(Continued)

*Primary Examiner* — Aaron L Troost

(57) ABSTRACT

A filter element analysis system for analyzing a filter element within a vehicle, the system including various filter sensors so as to provide information regarding various filter element parameters, a locator which configured provide vehicle position information such that conditions regarding the vehicle environment can be tracked and correlated to the location, as well as a means for transmitting information to a remote server for analysis and tracking of the filter element information with regard to environmental conditions such that a filter element status, remaining filter life, or particle load and replacement timeline can be calculated and updated so as to provide more accurate predictive models of the filter element conditions. As well as provide alerts regarding the need and scheduling of replacement or cleaning of a particular filter element.

5 Claims, 9 Drawing Sheets